United States Patent
Kampfer

[11] Patent Number: 6,132,660
[45] Date of Patent: *Oct. 17, 2000

[54] METHOD FOR FORMING HEADED STEM MECHANICAL FASTENERS

[75] Inventor: Robert D. Kampfer, Oakdale, Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/878,793

[22] Filed: Jun. 19, 1997

[51] Int. Cl.⁷ .................................................. B29C 43/44
[52] U.S. Cl. .................... 264/167; 24/442; 264/210.2; 264/296; 264/313
[58] Field of Search .................. 264/167, 210.2, 264/296, 313, 280; 24/442, 444, 452

[56] References Cited

U.S. PATENT DOCUMENTS

| | | | |
|---|---|---|---|
| 2,717,437 | 9/1955 | Mestral . | |
| 3,009,235 | 11/1961 | Mestral | 28/78 |
| 3,027,595 | 4/1962 | Takai et al. | 18/10 |
| 3,147,528 | 9/1964 | Erb | 24/204 |
| 3,192,589 | 7/1965 | Pearson | 24/204 |
| 3,408,705 | 11/1968 | Kayser et al. | 24/204 |
| 3,557,407 | 1/1971 | Lemelson | 18/10 |
| 3,594,863 | 7/1971 | Erb | 18/5 |
| 3,594,865 | 7/1971 | Erb | 18/5 |
| 3,629,032 | 12/1971 | Erb | 156/196 |
| 3,718,725 | 2/1973 | Hamano | 264/163 |
| 3,762,000 | 10/1973 | Menzin et al. | 24/204 |
| 4,056,593 | 11/1977 | Albareda | 264/145 |
| 4,290,174 | 9/1981 | Kalleberg | 24/204 |
| 4,315,885 | 2/1982 | Lemelson | 264/297 |
| 4,322,875 | 4/1982 | Brown et al. | 24/204 |
| 4,454,183 | 6/1984 | Wollman | 428/92 |
| 4,872,243 | 10/1989 | Fischer | 24/442 |
| 4,984,339 | 1/1991 | Provost et al. | 24/452 |
| 5,040,278 | 8/1991 | Eckhardt et al. | 29/243.53 |
| 5,058,247 | 10/1991 | Thomas et al. | 24/448 |
| 5,077,870 | 1/1992 | Melbye et al. | 24/452 |
| 5,256,231 | 10/1993 | Gorman et al. | 156/178 |
| 5,260,015 | 11/1993 | Kennedy et al. | 264/167 |
| 5,315,740 | 5/1994 | Provost | 24/452 |
| 5,339,499 | 8/1994 | Kennedy et al. | 24/452 |
| 5,512,234 | 4/1996 | Takizawa et al. | 264/511 |
| 5,607,635 | 3/1997 | Melbye et al. | 264/169 |
| 5,749,129 | 5/1998 | Murasaki et al. | 24/452 |
| 5,781,969 | 7/1998 | Akeno et al. | 24/452 |
| 5,792,408 | 8/1998 | Akeno et al. | 264/284 |
| 5,845,375 | 12/1998 | Miller et al. | 24/452 |
| 5,868,987 | 2/1999 | Kampfer et al. | 264/280 |

FOREIGN PATENT DOCUMENTS

| | | |
|---|---|---|
| 0 276 970 A2 | 8/1988 | European Pat. Off. . |
| 0 324 577 | 7/1989 | European Pat. Off. . |
| 0 771 537 A2 | 5/1997 | European Pat. Off. . |
| 3244410 A1 | 10/1983 | Germany . |
| 1 102 627 | 2/1968 | United Kingdom . |
| WO 82/02480 | 8/1982 | WIPO . |
| WO 87/06522 | 11/1987 | WIPO . |
| WO 94/23610 | 10/1994 | WIPO . |

OTHER PUBLICATIONS

94/23610

*Primary Examiner*—Jan H. Silbaugh
*Assistant Examiner*—Mark Eashoo
*Attorney, Agent, or Firm*—Gary L. Griswold; Robert W. Sprague; William J. Bond

[57] ABSTRACT

There is provided a method of deforming the hook head portions of hook elements on a web backing. The hook elements on the web backing are fed into a nip formed between a support surface and an upper heated surface having a durameter hardness of less than 90 Shore A. This upper heated surface compressively engages the hook head causing it to turn down and permanently deform. This increases the uniformity of the hook head elements forming a fiber engaging crook region.

14 Claims, 5 Drawing Sheets

METHOD FOR FORMING HEADED STEM MECHANICAL FASTENERS

BACKGROUND AND FIELD OF THE INVENTION

The present invention relates to a method and apparatus for capping upstanding stems to form mechanical fastener hooks. More particularly the invention relates to a method for forming capped hook shapes with greater uniformity and fiber engageability.

Hook and loop mechanical fasteners are widely used for a vast array of products and applications. There is a wide variety of methods for forming hook materials for use in these hook and loop type mechanical fasteners. Over the years it has been found that hooks have different engagement mechanisms and characteristics with mating loop materials, depending on the hooks and/or the loop material. This limits the practical applicability of any particular hook forming technique to producing hooks applicable for only certain types of uses or for use with only certain types of mated loop materials.

Some of the earliest hook materials were formed using the processes described in U.S. Pat. Nos. 2,717,437 and 3,009,235 in which special warps of upstanding nylon thread are cut so as to form open ended nylon hooks and nonfunctional upstanding stems material. Hooks formed by these types of methods are large (e.g., about 2 mm) requiring the use of large open pile materials and have a rather low number of hooks per unit area. These hooks are also quite abrasive and therefore not well suited for uses where the hooks would likely contact sensitive skin. Hooks of this type are still in use today due to their durability in long term use. Similar types of hook structures are formed in accordance with the method of U.S. Pat. No. 3,594,865 in which a thermoplastic material is directly formed into a J-shaped "wire" hook by use of shallow J-shaped dies. These "wire dies" are formed into a continuous loop of mold material which mold passes through an extruder. The extruder forces molten plastic, such as nylon, into the wire dies while also impregnating a fabric web immediately beneath the wire die mold material. On exiting the extruder, excess thermoplastic resin is stripped from the surface of the wire die molds. The resilient hooks remain on the backing when the die is removed by essentially just pulling the now solidified hooks and backing away from the wire die mold material. U.S. Pat. No. 3,594,863 relates to a similar apparatus for producing a hook bearing strip. Both these patents state that the methods described can produce a wide variety of shapes. U.S. Pat. No. 3,594,865 states that the traditional method for directly injection molding a hook is limited to shapes which must taper from base to tip. However, the hook shapes formed by these patents are relatively large and the hooks must taper from the outer face to the opposing face along the length of the hook.

The traditional molded type of hook shapes referred to in U.S. Pat. No. 3,594,865 are like those described in U.S. Pat. Nos. 4,984,339 and 5,315,740. These patents disclose molded J-shaped hooks which have a profile defined by an inner smooth contoured, generally concave face and a generally convex shaped outer face. The hook tapers smoothly and continuously in width from the hook base to the hook free end. The hook allegedly is designed so that it will not deform to release a loop engaged with the hook in shear mode or at a desired applied force. The later patent discloses a similar hook which has a low displacement volume for the area defining the hook tip. This is described as desirable for use in applications such as disposable diapers and the like.

Although these J-shaped hooks are generally adequately performing materials, they are extremely difficult to manufacture, particularly when very small hooks are made such as described in the '740 patent. Small complex shaped mold cavities are extremely difficult to manufacture and when forming extremely small hooks a proportionately larger number of J-shaped hook mold cavities must be formed. Small complex-shaped mold cavities are also much more susceptible to clogging and loss of mold cavity definition due to wear.

Extremely flexible and low cost methods for forming hooks of a wide variety of sizes and shapes are described in PCT Application Nos. WO 94/23610 and 92/04839 as well as U.S. Ser. No. 08/723,632. Using methods described in these patents and patent applications, a backing having a large number of upstanding thermoplastic stems is fed through a gap between a nip formed by, for example, two calendar rolls. The upper nip is smooth and heated so that the distal ends or tips of the stems are deformed under heat and mechanical pressure, forming various types of cap structures depending on the nip conditions selected, the relative speed of the stems in the nip, and the size and shape of the stems. The undeformed stem portion and the formed cap together form a hook structure. The precursor material, a backing having upstanding undeformed thermoplastic stems, can be formed by molding techniques. However, the formation and use of mold cavities in the shape of upstanding stems is much simpler and less problematic than forming J-shaped hook molds. For example, these simple mold cavity shapes are much less likely to clog or adversely wear, depending on the selection of the mold materials. Further, it has been found that by using this method it is relatively easy to form large numbers of small closely spaced hooks per unit area, which is particularly desirable for engagement with relatively low loft woven or nonwoven loop materials. These low loft loop materials are generally also low cost making this hook structure extremely desirable for low cost limited use applications such as disposable garments. Also advantageous is the tactile feel of these hook materials. Due to the high density of hooks and/or the hooks having a relatively flat or planar upper surface, the hooks are extremely skin friendly, non-abrasive and have a film-like texture. The preferred hook materials are essentially not even discernible as having hooks with casual skin contact. This also makes the hooks useful for disposable garments used close to the skin (e.g., diapers or surgical gowns). The present invention is directed at a method for improving the above method of hook formation and the hooks formed thereby.

BRIEF SUMMARY OF THE INVENTION

In the method of forming headed stem mechanical fasteners of the present invention, there is provided a precursor web material having an array of upstanding thermoplastic stem bases and hook heads projecting distally from at least one surface of a web backing. The upstanding stem bases can be any shape but preferably are a substantially constant width along the stem length or taper inward from the web backing up. On a top portion of the stem base is the hook head which has a portion that projects outwardly from the stem base. This outwardly projecting portion of the hook head forms a fiber engaging portion. The hook head generally can be formed by deforming a stem tip portion in a capping process or in a molding process. A hook head formed by capping or like processes will typically have a fiber engaging portion which extends outward from the stem base at any of a variety of angles depending on the process conditions of the, e.g., capping process.

In the invention process, the precursor web material having upstanding stem base portions and hook heads, with outwardly projecting fiber engaging portions, are fed into a nip which nip forms a gap. The gap can have a constant width or it can taper. The taper of the gap is over its length preferably from a given initial width to a narrower end width, however, the gap could in some cases taper slightly wider over at least a portion of the gap length. The nip forms a compression zone with an upper heated surface having an effective durometer hardness of less than 90 Shore A. The upper heated surface compressively engages the hook heads causing the hook head projecting fiber engaging portions to turn down and permanently deform. The permanently deformed, turn down, fiber engaging portions have an outward tip which is below a plane formed by the uppermost portions of the hook heads. The hook head fiber engaging portions preferably angle downward from the hook head top portion toward the base web. Also, preferably both the upper surface and the lower surface of the fiber engaging portion angle downward. This downward angle on the lower surface forms an included crook region or portion.

DETAILED DESCRIPTION OF THE PREFERRED EMBODIMENTS

Figure 1:
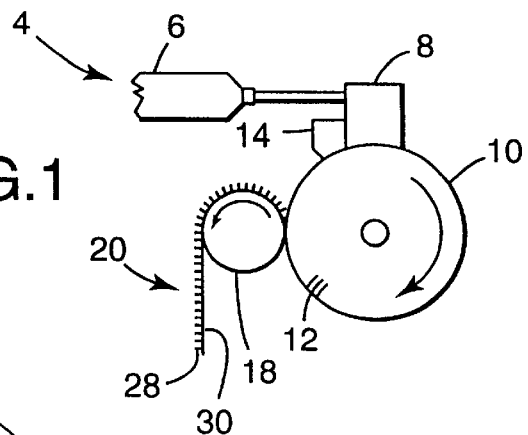
FIG. 1 is a schematic illustration of a method for making a strip of material having upstanding stems for making capped stem fasteners.

The precursor web material used in the invention method is a web backing with a given width dimension and an indeterminate length dimension. The backing has projecting from at least one surface a plurality of upstanding hook elements having stem bases. On a distal end of the stem bases are hook head portions with top portions and outwardly projecting fiber engaging portions. The hook elements can be distributed over the entire backing or over only a portion of the backing. The hook heads or stem bases can be any of a variety of shapes, however, the top portion of the hook head portion over the stem base is generally on substantially the same plane as the fiber engaging portions of the hook head portion. However, the hook head fiber engaging portions can project upward from the top of the hook head or slightly downward from the top of the hook head.

The mechanical fastener hook head portions are preferably provided by a capping process. In the preferred capping process, a heated surface member is positioned opposite a support surface member to form a nip, which preferably extends across the width of the web or backing surface or at least across a substantial portion of the web having the upstanding stems. The nip also extends along the length of the web for a given distance forming a compression zone. The precursor web is fed into the nip, which forms a gap. The gap tapers from a given initial width in the compression zone. Stem tips are initially engaged at a given entry gap width and are compressed in the nip to a given end gap width. In this compression zone, the nip progressively engages and compresses the polymeric stems between the heated nip surface member and the support surface member. Although this compression is preferably continuous, it can be intermittent and/or at different compression rates in the compression zone as determined by the gap width and change in gap width along the nip length. This heat and compression causes the distal ends of the thermoplastic upstanding stems to deform into cap or hook head structures capable of engaging a fibrous loop material.

In a preferred embodiment, at least in a portion of the compression zone, the surface of the heated nip member is provided with at least one series or set of peak and valley (groove) structures where the average peak to valley depth is generally from 5 to 500 microns. The average spacing of adjacent peak structures is less than the average width of the stem base immediately adjacent the stem end portions prior to being deformed by the heated surface member of the nip. Preferably, the peak structures are spaced so that each stem end portion contacts two to twenty, preferably four to ten, peak structures while being deformed. A given set of peak and valley structures preferably extends longitudinally for a distance at least equal to the average distance between adjacent upstanding stem members (average nearest neighbor distance in at least two directions) and preferably continuously along the length of the heated nip member in the compression zone. Similarly sufficient peak and valley structures are provided in a given set so that adjacent peak and valley structures extend laterally at least for a distance equal to the average distance between adjacent upstanding stem members (average nearest neighbor distance in at least two directions). The peak and valley structures on the heated nip member provide for capped stem hooks having substantially enhanced directionality and, depending on the structure, more uniformity of hook head shape across the length and width of the web.

The method and apparatus of the invention are directed at deforming previously formed hook heads of a hook elements on a precursor web. The precursor web is provided with an upstanding array of hook elements having thermoplastic stem base portions and hook head portions with outwardly projecting fiber engaging portions which stems and hook heads project away from a web backing. The apparatus includes a heated elastically deformable deforming surface member having an effective durometer hardness at the use temperature of less than about 90 Shore A, preferably less than 80 Shore A, opposite a support surface member forming a nip, which nip can taper from an entry gap width to an end gap width defining a compression zone. The effective durometer hardness of the deforming surface is generally greater than 30 Shore A and preferably greater than 50 Shore A. A feed means is provided for feeding the precursor web into and through the nip compression zone.

In the invention method, the nip gap width can decrease in the compression zone, the nip may also have a generally constant gap width along at least a portion of its length in the compression zone or the gap width may decrease and increase intermittently or decrease at different rates, or combinations of the above. Generally, the nip compression zone length is defined by a first entry gap width and a second gap, which generally is equal to or less than the first gap width, defining a nip end gap. The given nip entry gap width is defined by the thickness of the backing substrate web and average height of the upstanding hook elements at the point at which the precursor web material hook elements first compressively engage the heated upper surface defining the nip. The end gap width is the narrowest gap width in the nip after which point the web and deformed hook heads substantially disengage compressively with the heated nip surface member. The narrowest gap or linear pressure is generally set to selectively deform the hook head fiber engaging portion which setting is dependent on the hardness of the material forming the hook element, the shape and spacing of the hook elements, the hardness of the deforming surface, and the temperature of the deforming surface. This selective deformation results in the outwardly projecting fiber engaging portions of the hook heads deforming so that they generally project at a downward angle from the hook head top portions toward the base web. This downward angle (measured from a reference line taken from the top of hook head and parallel with the backing) is generally from 0 to 70 degrees, preferably from 5 to 60 degrees, most preferably 5 to 35 degrees (defined by a linear extent running from a center region of the hook head top portion to an end of the hook head fiber engaging portion).

The headed stem hook fasteners of the invention can be formed using a precursor web of a backing material having an array of upstanding, plastically deformable, thermoplastic hook elements. These upstanding hook elements are preferably formed on an integral backing of the same thermoplastic material. Suitable thermoplastic materials include polyolefins such as polypropylenes or polyethylenes, polyamides such as nylon, polyesters such as poly(ethylene terephthalate), plasticized polyvinyl chloride, copolymers and blends thereof, optionally, with other polymers or plasticizers, or the like.

A suitable method for forming the web used to form this precursor web material, for a capped stem type of headed stem hook fastener, is shown in FIG. 1. A feed stream 4 of preselected thermoplastic resin is fed by conventional means into an extruder 6 which melts the resin and moves the heated resin to a die 8. The die 8 extrudes the resin as a wide ribbon of material onto a mold surface 10, e.g., a cylinder, having an array of mold cavities 12 in the form of elongated holes, which preferably taper to facilitate removal of the solidified resin from the mold cavities. These holes or mold cavities are preferably in the form of straight (i.e., only one axis in the length direction) cavities. The mold cavities can be connected to a vacuum system (not shown) to facilitate resin flow into the mold cavities. This could require a doctor blade or knife to remove excess material extruded into the interior face of the mold cylinder. The mold cavities 12 preferably terminate in the mold surface having an open end for entry of the liquid resin and a closed end. In this case, a vacuum 14 could be used to at least partially evacuate the mold cavities 12 prior to entering the die 8. The mold surface 10 preferably matches that of the die 8 where they are in contact to prevent excess resin being extruded out, e.g., the die side edges. The mold surface and cavities can be air or water cooled, or the like, prior to stripping the integrally formed backing and upstanding formed stems from the mold surface such as by a stripper roll 18. This provides a web 20 of a backing 30 having integrally formed upstanding stems 28 of thermoplastic material. Alternatively, upstanding stems could be formed on a preformed backing or the like by extrusion molding or other known techniques.

Figure 2:
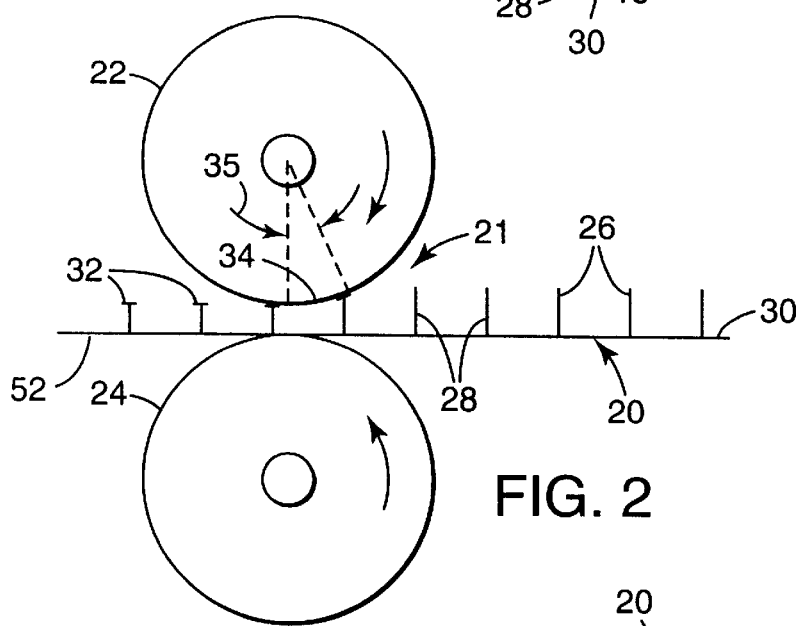
FIG. 2 is a schematic illustration of a method for capping hook heads using a calendaring system.

The stems formed by the method of FIG. 1, or like methods, can be capped to form a precursor web material hook element by use of a heated nip which can be formed by two calendar rolls, 22 and 24, as shown in FIG. 2. The heated calendar roll 22 contacts a predetermined portion of a distal end 26 of the stems 28 projecting upward from the backing 30. The roll temperature will be that which will readily deform the distal ends 26 under pressure created by the nips in the compression zone 35 without causing resin to stick to the roll 22 surface. The roll surface can be treated with release coatings resistant to high temperature to allow for higher temperatures and/or longer contact times between the stem tips or distal ends 26 and the heated roll 22.

Figure 4:
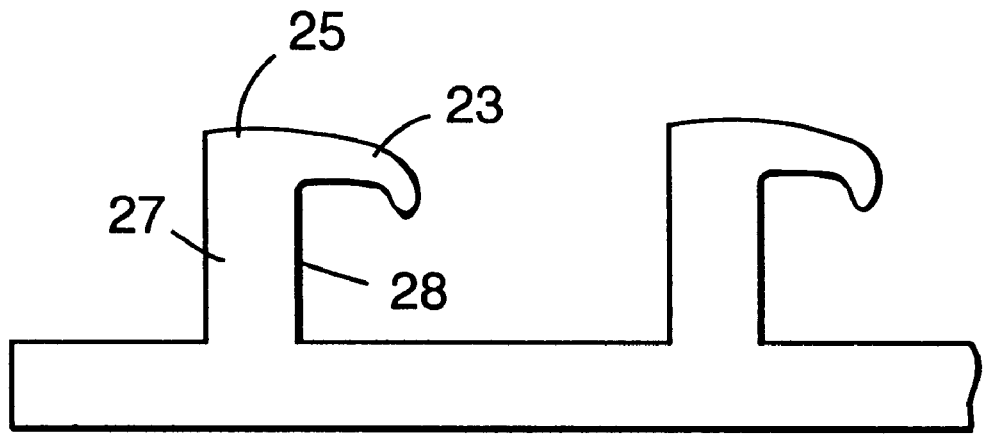
FIG. 4 is a side view of a headed stem fastener such as used in the invention method.
Figure 7:
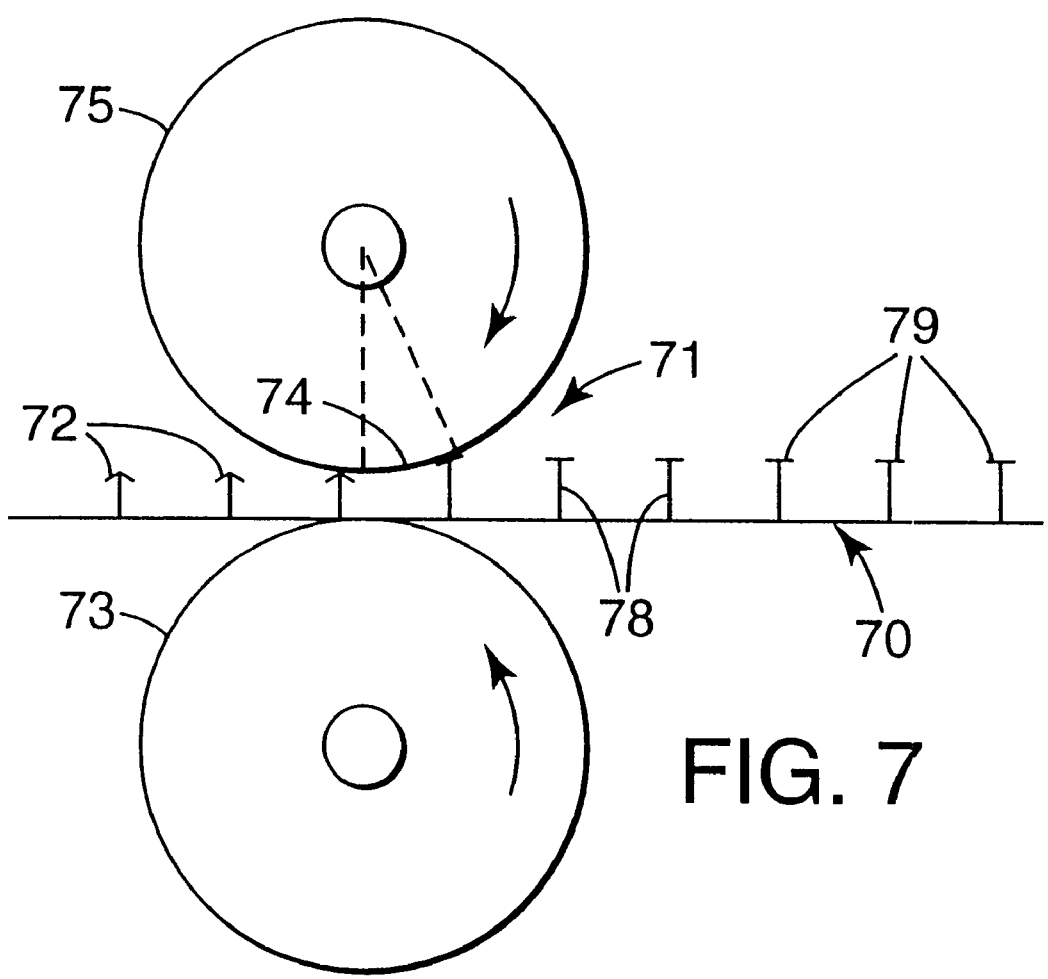
FIG. 7 is a schematic illustration of a method for deforming hook heads using a calendaring system in accordance with the invention method.

In the invention method a nip, 71 such as shown in FIG. 7 and formed by rolls 75 and 73, is used to further deform a headed stem mechanical fastener element, 78 such as shown in FIG. 4. The surface of the, e.g., elastic deformation heated roll 75 is provided with a material having a durometer hardness which will permit the hook head fiber engaging portion 79 to be compressively deformed downward into downward position 72 relative to the hook head top portion by the heated deformation roll 75 without substantially deforming the stem base portion 28 and/or the hook head top portion. As such with relatively stiff or high modulus material forming the stem base portion, larger average diameter stem base portions, a higher density of hook elements or a higher temperature deformation roll, the roll material can have a higher relative durometer hardness. The material forming the heated deformation roll outer surface 74 can be any relatively thermally stable elastically deformable material such as silicone rubber. The outer surface of the heated deformation roll 74 can be treated with release materials as above.

The contact time between the hook head and the heated deformation surface member 75 should be relatively brief such that the heated deformation surface member 75 deforms the projecting fiber engaging portion 79 of the hook head without substantial deformation of the stem base portion 78. The heated deformation member 75 then elastically recovers to be available for deformation of subsequent fiber engaging portions 79.

Figure 6A:
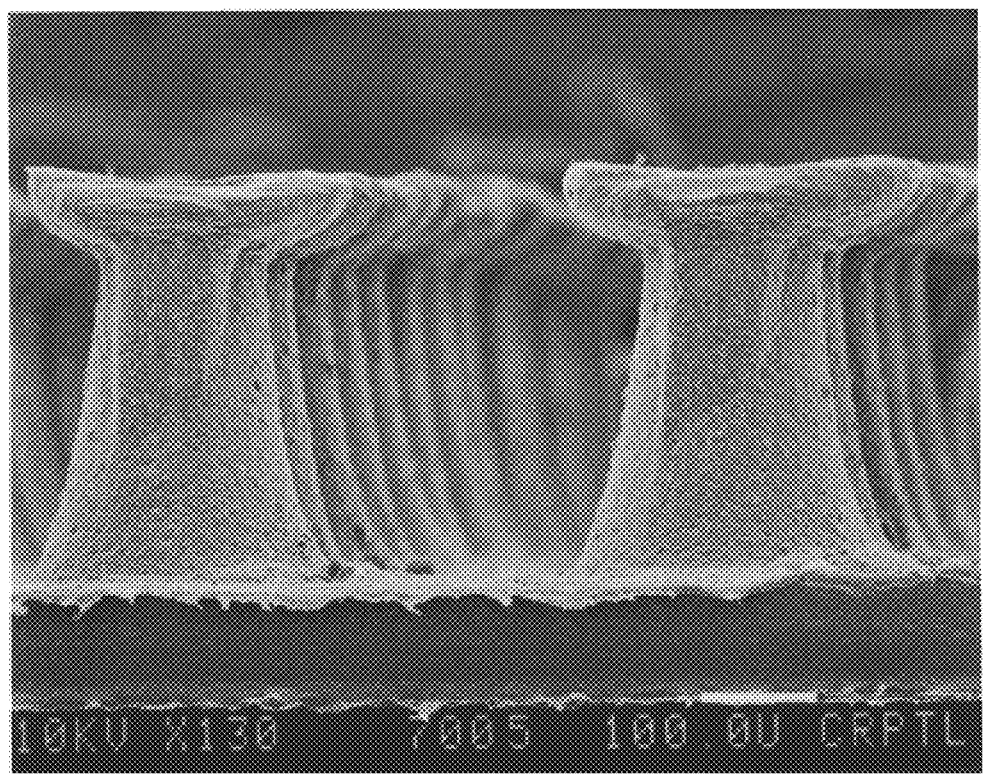
FIGS. 6A and 6B are before and after photographs of a headed stem fastener produced by the invention method.
Figure 6B:
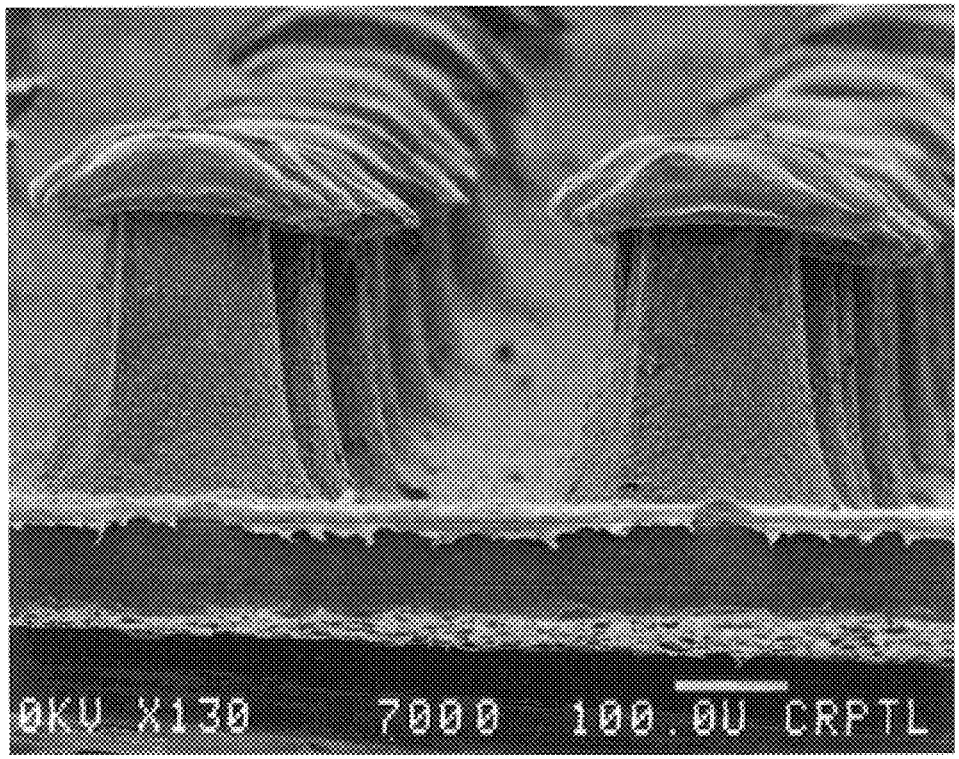

As shown in FIGS. 6A and 6B, for example, the invention method improves the uniformity of a hook head shape by deforming the hook head 25 fiber engaging portions 23 to the same relative downward slope assuming the precursor web original hook element height and backing thickness are relatively uniform.

Such uniformity of precursor web hook elements and backing thickness are obtained by the preferred capping process, as described relative to FIG. 2 for originally forming the hook elements. Although the thickness of the precursor web (e.g., the total of the hook element height and web backing thickness) will be substantially uniform with this method of forming the hook elements, the outwardly projecting fiber engaging portions 23 can vary significantly with respect to their orientation relative to the backing, particularly from lot to lot. This variability is substantially reduced by the invention process while also providing a downwardly projecting hook fiber engaging portion 23 which has an enhanced ability to grab individual fibers of a mating fibrous loop material.

Alternative methods and apparatus (e.g., FIG. 3) for producing the invention headed stem fasteners could be similar to those disclosed in copending U.S. application Ser. No. 08/781,783 except modified to provide a heated roll of a suitable hardness. In the method and apparatus of FIG. 3, a capping apparatus 50 can be used to form a headed stem fastener element 52 having a plurality of generally uniform heads 32 or to further deform the fiber engaging portion of a headed stem fastener element in accordance with the invention apparatus and method as described above. A precursor web 20 having a backing 30 with a rear surface 58 and a multiplicity of polymeric stems 28 or formed stem fastener elements projecting distally from a front surface 53 is directed into a nip inlet 64. The nip inlet 64 is formed between a heated roll 66 and a curved support structure 68. The curved support structure 68 preferably has a shape generally corresponding to that of the heated roll 66 at a slightly larger radius of curvature. Piston 80 provides a compressive force between the curved support structure 68 and the heated roll 66.

The nip 64 defines a first entry gap width at a nip inlet 72 and a second end gap width at a nip outlet 76 defining a compression zone 75. The second end gap width is preferably less than the first gap width. In the preferred embodiment, the nip 64 gap width decreases continuously at a substantially linear rate of change at least at some region. Preferably, this substantially linear rate of change in the gap width is at least in a region immediately adjacent the nip inlet entry gap width between the nip inlet 72 and nip outlet 76. In an alternate embodiment (not shown), the nip 64 may decrease to a minimum value at some intermediate location between the nip inlet 72 and outlet 76 or decrease then increase then decrease again, etc.

A fluid, such as air or water, may be introduced through pipe 78 to the interface between the rear surface 58 of the backing 30 and the surface 116 to create a fluid bearing. The surface 116 may optionally be coated with a low surface energy material such as polytetrafluoroethylene (PTFE) or ultra high molecular weight polyethylene. Without the air bearing, the backing 30 tends to wrinkle as it enters the nip 64, potentially causing tears in the backing 30. A piston 80 is provided for positioning the curved support structure 68 relative to the heated roll 66. The curved support structure 68 may also pivot along a pivot point 82 to further adjust the nip 64 gap width in the compression zone 75.

Figure 3:
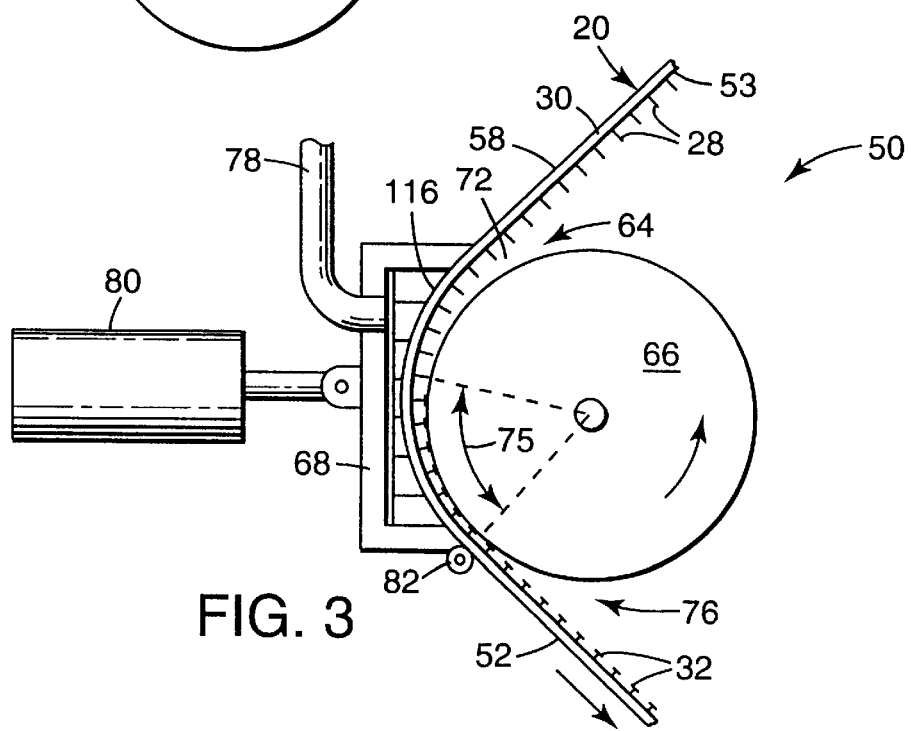
FIG. 3 is a schematic illustration of an alternative apparatus for forming headed stem fasteners usable in the invention method.

When forming a headed stem fastener from upstanding stems using the apparatus of, e.g., FIG. 3, the relative speed of the heated roll 66 and the line speed of the precursor web 20 determines the overall shape of the capped heads 32 on the headed stem fastener 52. The rate of rotation of the heated roll 66 may be greater than, less than or equal to the line speed of the precursor web 20. For some applications, the roll 66 may be stationary while the precursor web 20 moves through the nip. Alternatively, the roll 66 may be rotated in a direction opposite the direction of movement of the precursor web 20.

Synchronous movement of the heated surface 22 or 66 is preferred to form more symmetrical heads about the stem (i.e., generally symmetrical about two or more planes of reflection). Alternatively, the relative movement of the heated surfaces 22 and 66 can be slightly asynchronous to achieve asymmetrical heads about the stem (i.e., with one or less planes of reflection), such as J-shaped hooks.

Also in forming a precursor web with capped headed stem fastener elements the specific shape and orientation of the capped heads 32 can be determined by the relative size, spacing and orientation of peaks and grooves that can be provided on the heated surface member (as discussed above), the relative speeds of the web 20 and the heated surface member, as well as the temperature and shape of the heated surface member and gap formed and the length of the compression zone. If grooves are provided on the heated surface member they are preferably continuous and uniform across the heated surface member. The grooves can be orientated in the machine direction or orientated in the direction of web movement through the nip in the compression zone. This results in a stem head which is longer in the machine or web movement direction than a cross direction.

It is also possible to angle the orientation of the grooves provided on a heated surface member relative to the machine direction or direction of web movement. Where the peaks and grooves are angled relative to the machine direction, the resulting capped heads can be provided with elongated axes at angles relative to the web longitudinal direction. However, when peaks and grooves are angled relative to the machine direction, the relative speeds of the web and the heated surface member should be substantially matched to prevent the peaks from rasping or scraping the stems. The angle of the sets of peaks and grooves relative to the machine direction can range from greater than zero up to 180 degrees.

Overall, the precursor web headed stem fastener elements used in the invention method, regardless of how they are formed, are in the shape of substantially upstanding stem base portions, which base portions are at an angle of about 90 degrees from the backing substrate, however, this angle can range from 80 to 100 degrees, preferably 85 to 95 degrees. The hook head portion is formed on a distal end 26 of the stem portion. The hook heads can be elongated in one or more directions forming the fiber engaging portions. These fiber engaging portion extend outward from the stem portion at any angle so that they can project upward away from the film backing, parallel with the film backing, or even downward toward the film backing. Preferred hook head portions are the generally flat or planar upper top surfaces of hook heads such as are formed by a capping method. These hook heads are well suited for engaging relatively open woven and nonwoven loop products such as used in disposable or limited use garments. A flat or planar upper hook head top surface is also non-abrasive and tactually smooth to the skin unlike molded hooks which generally have a distinct apex (e.g., on the hook slopes away from a peak in at least two directions). Apexed hook fasteners are less skin friendly, making them less well suited for use in connection with sensitive skin (e.g., on a baby diaper).

For use on diapers and like garments, the invention deformed hook elements are preferably of uniform height, preferably from about 0.10 to 1.3 mm in height, and more preferably from about 0.2 to 0.5 mm in height. Particularly with the preferred precursor web capped stem hook elements, the deformed hooks have a density on the backing preferably of from 60 to 1,600 hooks per square centimeter, and more preferably from about 100 to 700 hooks per square centimeter. The stem base portions have a diameter adjacent the deformed hook head portions of preferably from 0.07 to 0.7 mm, and more preferably from about 0.1 to 0.3 mm. The deformed hook heads project radially past the stem base portions on at least one side preferably by, on average, about 0.01 to 0.3 mm, and more preferably by, on average, about 0.02 to 0.25 mm and have average thicknesses between their outer and inner surfaces (i.e., measured in a direction parallel to the axis of the stems) preferably from about 0.01 to 0.3 mm and more preferably from about 0.02 to 0.1 mm. The hook head portions have an average diameter (i.e., measured radially of the axis of the heads and stems) to average head thickness ratio preferably from 1.5:1 to 12:1, and more preferably from 2.5:1 to 6:1. To have both good flexibility and strength, the backing of the headed stem fastener preferably is a film from 0.02 to 0.5 mm thick, and more preferably is from 0.06 to 0.3 mm thick, especially when the fastener is made of polypropylene or a copolymer of propylene and ethylene. For some uses, a stiffer backing could be used, or the backing can be coated with a layer of pressure-sensitive adhesive on its surface opposite the surface with the capped stem hooks, by which the backing could be adhered to a substrate.

For most hook-and-loop uses, the deformed hook elements should be distributed substantially uniformly over the entire surface area of the web backing, usually in a square, staggered or hexagonal array.

Figure 5:
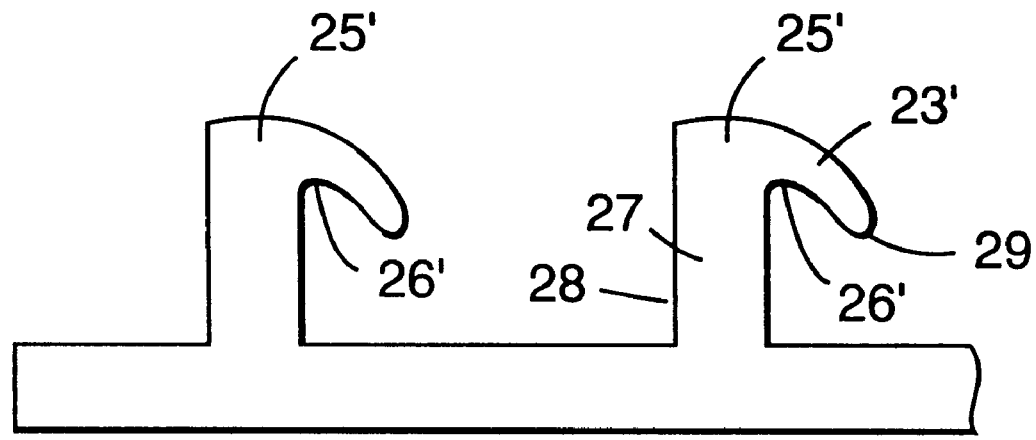
FIG. 5 is a perspective view of a headed stem fastener produced by the invention method.

The invention method produces upstanding thermoplastic hook projections as shown in FIG. 5 and FIG. 6B with a substantially undeformed stem base portion 27 and a hook head portion 25' having a deformed fiber engaging portion 23'. The deformed fiber engaging portion 23' projects downward. Preferably, the lower surface of the fiber engaging portion also projects downward forming a crook 26' between the lower face of the fiber engaging portion 23' and the stem base portion 27. The degree of deformation of the fiber engaging portion 23' depends on the relative hardness of the heated roll 22; the shape, thickness and material forming the fiber engaging portion 23; the nip pressure; and the nature of the stem portion 27.

The invention headed stem fasteners can be produced in long, wide webs that can be wound up as rolls for convenient storage and shipment. The headed stem fastener material in such rolls can have a layer of pressure-sensitive adhesive on the surface of the backing opposite that with the deformed hook elements, which adhesive can releasably adhere to the heads of the deformed hook elements on underlying wraps of the headed stem fastener in the roll. These rolls do not require a release liner to protect the layer of pressure-sensitive adhesive in the roll. The limited area of the heads to which the pressure-sensitive adhesive is adhered in the roll maintains the headed stem fastener material in a stable roll form until it is ready for use, and then allows the fastener material to be easily unwound from the roll. Pieces of desired lengths of headed stem fasteners can be cut from the roll of fastener material and adhesively or otherwise secured to articles such as a flap of a garment to permit the flap to be releasably fastened. The deformed headed stem fasteners of the invention find particular use on a fastening tab or otherwise attached to a disposable or limited use garment such as a diaper or hospital gown. The deformed headed stem fasteners can also be used as self mating fastener elements.

Test Methods

All tests were carried out at constant temperature and humidity in a room set at 23° C. and 50% relative humidity.

135 Degree Peel Test

The 135 degree peel test was used to measure the amount of force that was required to peel a sample of the headed stem mechanical fastener material from a sample of loop fastener material.

A 2 inch×5 inch (5.08 cm×12.7 cm) piece of a loop test material was securely placed on a 2 inch×5 inch (5.08×12.7 cm) steel panel by using a double-coated adhesive tape. The loop material was placed onto the panel with the cross direction of the loop material parallel to the long dimension of the panel. A 1 inch×5 inch (2.54 cm×12.7 cm) strip of the mechanical fastener to be tested was cut and a mark was placed 1 inch (2.54 cm) from both ends of the mechanical fastener strip. The hook strip was then centrally placed on the loop so that there was a 1 inch×1 inch (2.54 cm×2.54 cm) contact area between the strip and the loop material and the leading edge of the strip was along the length of the panel. The strip and loop material laminate was then rolled by hand, once in each direction, using a 4.5 lb (1000 gram) roller at a rate of approximately 12 inch (30.5 cm) per minute. Paper was used between the nonengaging regions of the strip and the loop material to ensure a maximum 1 inch (2.54 cm) engagement. Holding the leading edge of the strip the laminate was sheared slightly by hand approximately ⅛ inch (0.32 cm), engaging the hook elements of the strip into the loops. The sample was then placed in a 135 degree peel jig. The jig was placed into the bottom jaw of an Instron™ Model 1122 tensile tester. Without pre-peeling the sample, the leading edge was placed in the upper jaw with the 1 inch mark at the bottom edge of the jaw. At a crosshead speed of 12 inch (30.5 cm) per minute, a chart recorder set at a chart speed of 20 inch (50.8 cm) per minute was used to record the peel which was maintained at 135 degrees. An average of the four highest peaks was recorded in grams. The force required to remove the mechanical fastener strip from the loop material was reported in grams/2.54 cm-width. Reported values are an average of at least five tests.

135 Degree Twist Peel Test

The 135 degree twist peel test was carried out in a manner similar to the 135 Degree Peel Test except that the sample preparation was different. After the mechanical fastener strip was placed on top of the loop material on the panel, a 9 lb (4 kg) weight was placed on top of the laminate. Then the weight was twisted approximately 0.5 inch (1.3 cm) in one direction, then 0.5 inch (1.3 cm) in the opposite direction. This was done two times for a total of four twists. The twist peel test was then carried out as described above for the 135 degree peel test.

Quick Stick

This test method was used to determine the force required to disengage a hook and loop type mechanical fastener system after a minimal force had been applied to engage the mechanical fastener material and loop material.

A 2 inch×5 inch (5.08 cm×12.7 cm) piece of a loop test material was securely placed on a 2 inch×5 inch (5.08×12.7 cm) steel panel by using a double-coated adhesive tape. The loop material was placed onto the panel with the cross direction of the loop material parallel to the long dimension of the panel. A 90 degree peel jig was then placed in the bottom jaws of an Instron™ constant rate of extension tensile tester. The loop on the panel was then inserted into the 90 degree peel jig. A 1 inch×1 inch (2.54 cm×2.54 cm) piece of mechanical fastener material was securely attached to a 250 gram weight test apparatus using a double coated adhesive tape. The test apparatus was then inserted into the top jaw of the tensile tester and without applying any pressure was placed on top of the loop material. With the test apparatus speed set at 12 inch (30.5 cm) per minute, a chart recorder set at a chart speed of 5 inch (12.2 cm) per minute was used to record the force required to disengage the mechanical fastener material from the loop material. The peak value was read off of the chart output and the force was recorded in grams/2.54 cm-width. Reported values are an average of at least two tests.

EXAMPLES

Examples 1–4

A precursor web material having an array of upstanding thermoplastic stems was prepared in a manner similar to that described for the Example in PCT application no. WO 94/23610. The stem density was 2500 stems/inch$^2$ (386 stems/cm$^2$). The height of the stems was 18 mils (0.46 mm) and the width or diameter of the stems was 7.9 mils (0.20 mm). The web backing thickness was approximately 5 mils (127 microns). The precursor web was prepared from an ethylene-propylene impact copolymer resin such as those available from Union Carbide as #SRD7-587 and #SRD7-560.

The precursor web was feed through a nip formed by two calendar rolls. The surface of the top roll, which contacted the distal ends or tips of the stems, had a pattern of peak and valley (groove) structures. The grooves were approximately 0.98 mil (0.025 mm) deep and were spaced 2 mils (0.050 mm) apart. The grooves were oriented in the cross direction. The temperature of the top roll was set at 290° F. (143° C.), and the temperature of the bottom roll, which contacted the web backing, was set at 60° F. (16° C.). The nip gap was 8 mils (0.20 mm) and the precursor web was fed through the nip one time. The piston pressure holding the calendar rolls together was sufficient to compress the melt zone. The line speed was 10.7 meters/minute. The resulting capped stem hooks were elongated in the machine direction. The diameter of the cap in the machine direction was 12 mils (0.30 mm) whereas the diameter of the cap in the cross direction was 8 mils (0.20 mm). The height of the capped stems was 13.5 mils (0.34 mm).

This elongated capped stem hook fastener was used as a precursor web which was fed into a heated rubber nip. The top roll consisted of a 6 inch (15.2 cm) diameter roll having approximately 0.25 inches (0.63 cm) of silicone rubber coated on its outer surface. The durometer of the rubber coating was approximately 58 Shore A. The top roll was heated with an electric heating element to a surface temperature of approximately 300° F. (139° C.). The backup roll was approximately 10 inches (25.4 cm) in diameter and had a silicone rubber coating of approximately 0.25 inches (0.63 cm). The durometer of the rubber coating was approximately 70 Shore A. The backup roll was cooled with tap water. The elongated capped stem hook fastener was fed into the heated rubber nip at a line speed of 55 feet/minute (17 meters/minute) with a nip pressure of approximately 22 pli. The resulting headed stem hook fastener was tested for quick stick, 135 degree peel, and 135 degree twist peel. The elongated capped stem hook fastener that was used as a precursor web was also tested as a control. The peel tests were carried out such that the peel front was perpendicular to the long axis of the caps. The loop material used for testing was a nonwoven loop material similar to that used as the loop fastening surface on Huggies™ Supreme™ infant diapers. Results are given in Table I along with the resulting dimensions of the hook head.

Using the same nip pressure and roll temperatures, samples of the elongated capped stem hook fastener precursor web were fed into the heated rubber nip at line speeds of 75 feet/minute (23 meters/minute), 100 feet/minute (30 meters/minute), and 125 feet/minute (38 meters/minute). The resulting headed stem hook fasteners were also tested. Test results and dimensions of the hook head are given in Table I.

TABLE I

| Example | Line speed (m/min) | Hook Head length (mm) | Hook Head width (mm) | Hook Head thickness (mm) | Quick stick | 135° Peel | 135° Twist Peel |
|---|---|---|---|---|---|---|---|
| Control | — | 0.30 | 0.20 | 0.08 | 32 | 107 | 529 |
| 1 | 17 | 0.31 | 0.21 | 0.09 | 98 | 695 | 887 |
| 2 | 23 | 0.29 | 0.19 | 0.10 | 135 | 704 | 901 |
| 3 | 30 | 0.32 | 0.20 | 0.06 | 100 | 505 | 922 |
| 4 | 38 | 0.33 | 0.22 | 0.07 | 40 | 506 | 765 |

Example 6

A precursor web having round capped stem fasteners ("golf tee" shaped) was prepared in a manner similar to that described for the Example in PCT application no. WO 94/23610. The precursor web was prepared from an ethylene-propylene impact copolymer resin such as those available from Union Carbide as #SRD7-587 and #SRD7-560. The stem density was 1600 stems/inch$^2$ (247 stems/cm$^2$). The height of the stems was 12.5 mils (0.31 mm), the width or diameter of the caps was 12 mils (0.30 mm), and the stem diameter was tapered from the base (0.30 mm) to just below the cap (0.20 mm). The cap thickness was 0.03 mm. The web backing thickness was 5 mils (127 microns).

Samples of the round capped stem fastener were fed into a heated nip as described in Examples 1–4. The nip pressure was 34 pli, the line speed was 50 feet/minute (15 meters/minute), and temperature of the top rubber coated roll was 275° F. (135° C.). This resulted in a slight curling of the hook head to substantially flatten the fiber engaging portion of the hook head.

Example 7

The same precursor web used in Example 6 was fed into a heated nip in a manner similar to that described for Example 6 except that the top rubber roll was heated to 280° F. (137° C.). This resulted in more curling of the fiber engaging portion compared to Example 6 to give a mushroom shaped hook head.

Example 8

The same precursor web used in Example 6 was fed into a heated nip in a manner similar to that described for Example 6 except that the top rubber roll was heated to 304° F. (151° C.). This treatment resulted in a mushroom hook head which completely curled over until the fiber engaging portion met the stem.

We claim:

1. A method of forming a headed stem mechanical fastener having a backing web and an array of upstanding hook elements with upstanding stem base portions and hook heads with downwardly projecting fiber engaging portions comprising:

a) providing a web having a web backing with an array of substantially upstanding thermoplastic hook element projections each formed at least in part by a substantially upstanding stem base portion and a hook head having a fiber engaging portion and a top portion where the fiber engaging portion extends outward from the stem base portion, the web including the hook element projection having an average first thickness;

b) providing a nip having at least one heated deformation surface member having an elastically deformable surface having an effective durometer hardness of less than 90 shore A and at least one opposing surface member defining a gap which has a compression zone defined by a entry gap width and a end gap width, where the entry gap width is substantially equal to or less than the web first average thickness;

c) moving the web along a web path into and through the compression zone such that at least a portion of the array of substantially upstanding hook element fiber engaging portions are preferentially deformed downward relative to the hook head top portion by elastic deformation of the heated surface deformation member.

2. The method of forming a headed stem mechanical fastener of claim 1 wherein the heated surface deformation member moves at a first speed and the opposing surface member moves at a second speed.

3. The method of forming a headed stem mechanical fastener of claim 2 wherein the first speed is substantially equal to the second speed.

4. The method of forming a headed stem mechanical fastener of claim 2 wherein the first speed is substantially different than the second speed.

5. The method of forming a headed stem mechanical fastener of claim 1 wherein the heated surface member has a Shore A hardness from 30 to less than 90.

6. The method of forming a headed stem mechanical fastener of claim 1 wherein the compression zone has two or more heated deformation surface members.

7. The method of forming a headed stem mechanical fastener of claim 1 wherein the upstanding hook projections are formed of a polyolefin.

8. The method of forming a headed stem mechanical fastener of claim 1 wherein the first and second surface members forming the nip are formed by two calendar rolls.

9. The method of forming a headed stem mechanical fastener of claim 1 wherein the gap width decreases between the first entry gap width and the second end gap width.

10. The method of forming a headed stem mechanical fastener of claim 1 wherein the heated surface deformation member has an effective durometer hardness of from 50 to 80 Shore A.

11. The method of forming a headed stem mechanical fastener of claim 1 wherein the heated surface deformation member has an outer surface formed by silicone rubber.

12. The method of forming a headed stem mechanical fastener of claim 1 wherein the undeformed hook head fibers engaging portion project upward from the top of the hook head.

13. The method of forming a headed stem mechanical fastener of claim 1 wherein the deformed hook head fiber engaging portion projects at an angle from 0 to 70 degrees downward from the top of the hook head toward the web backing.

14. The method of forming a headed stem mechanical fastener of claim 1 wherein the deformed hook head fiber engaging portion projects at an angle from 5 to 60 degrees downward from the top of the hook head toward the web backing.

* * * * *